United States Patent Office 3,705,895
Patented Dec. 12, 1972

3,705,895
PROCESS FOR THE DIRECT SYNTHESIS OF
STYRYLPYRIDINIUM CHLORIDES
Stephen David Levy and Richard Steven Wayne, Trenton,
N.J., assignors to American Cyanamid Company, Stamford, Conn.
No Drawing. Filed Nov. 4, 1970, Ser. No. 86,779
Int. Cl. C09b 23/14
U.S. Cl. 260—240 D                     6 Claims

ABSTRACT OF THE DISCLOSURE

A novel process for the direct preparation of o- and p-styrylpyridinium chlorides of the formula:

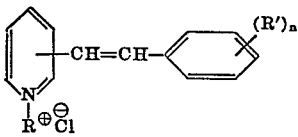

in which R is lower alkyl of from 1 to 6 carbon atoms, R' is selected from the group consisting of hydrogen, lower alkyl ($C_1$–$C_4$), alkoxy ($C_1$–$C_6$), nitro, lower alkylamino ($C_1$–$C_4$) and halogen, and $n$ is an integer selected from 1 and 2, by reacting a dialkylpyridinium chloride in a polar solvent with a weak base or in a non-polar solvent with a strong base is disclosed.

This invention relates to a novel process for the direct preparation of o- and p-styrylpyridinium chlorides of the formula:

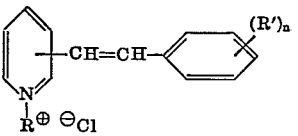

in which R is lower alkyl of from 1 to 6 carbon atoms, R' is selected from the group consisting of hydrogen, lower alkyl ($C_1$–$C_4$), alkoxy ($C_1$–$C_6$), nitro, lower alkylamino ($C_1$–$C_4$) and halogen, and $n$ is an integer selected from 1 and 2. More particularly, the invention relates to the condensation of a dialkylpyridinium chloride of the formula:

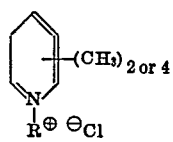

with an aldehyde of the formula:

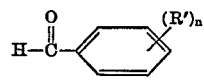

with a catalyst-solvent system consisting of one or more particular polar solvents and the weak base catalyst or the non-polar solvent chloroform and one or more particular strong bases.

The styrylpyridinium chlorides of Formula I are useful in the control and treatment of helminthiases in warm-blooded animals. General methods for their preparation and use are disclosed, for example, in U.S. Pat. No. 3,177,116 and 3,179,559 to I. B. Wood et al.

These compounds also have utility as antifeeding compounds effective for reducing or preventing insects, such as, Southern Armyworms and mites, from feeding on growing plants. Generally, about 1000 p.p.m. of the active material applied as a liquid spray to the foliage is effective in protecting the plants from insect feeding.

The styrylpyridinium salts corresponding to Formula I have been conventionally prepared by condensing a dialkylpyridinium salt with a benzaldehyde in an alcohol such as isopropanol with a strong base such as piperidine. Typically, the reactants are merely refluxed together and the solid product is filtered from solution and dried. This reaction scheme is inoperative to produce the chlorides directly. Accordingly, other salts, such as methyl sulfates, have been prepared and then converted in the second step to the chlorides by treatment with a salt, such as, barium chloride or calcium chloride. The disadvantages of these two step syntheses are avoided by the process of the present invention.

It has been found that if the weak base, ammonium acetate, is employed as a catalyst in combination with a polar solvent, such as isopropanol, the styrylpyridinium chlorides can be directly synthesized, thereby avoiding the inconvenience and expense of initially preparing another salt. It has further been found that direct synthesis of the chlorides can be achieved in a non-polar solvent, chloroform, in combination with a strong base. It has further been found that 1-methyl-2-(p-chlorostyryl)pyridinium chloride is produced with exceptional purity and high yield by reacting 1,2-dimethylpyridinium chloride with p-chlorobenzaldehyde in a chloroform solution with a piperidine catalyst by refluxing the solution at temperatures not exceeding 75° C. and by removing the water formed by the condensation reaction.

The polar solvents employed in the present invention are one or more members selected from the group consisting of isopropanol and alkanols having from 4 to 7 carbon atoms. Suitable alcohols include, for example, n-butanol, sec-butanol, t-butanol, 1-pentanol, 2-pentanol, 1-hexanol, 2-hexanol, 3-hexanol, 1-heptanol, 2-heptanol, 3-heptanol, 4-heptanol, 3-methylpentanol, and 2-ethylmethylbutanol.

Suitable strong bases include, for example, piperidine, triethylamine, diethylamine, sodium acetate and mixtures thereof.

In carrying out the direct synthesis of various styrrylpyridinium chlorides with ammonium acetate and polar solvents, the relative quantities of the reactants and the reaction conditions can be widely varied. It is generally preferred to combine the alkyl chloride and 2- or 4-picoline in equimolar quantities. It is generally preferred to employ the benzaldehyde in slight excess to insure complete reaction of the dialkylpyridinium chloride. Generally, about 1.2 moles of the benzaldehyde per mole of the dimethylpyridinium chloride is suitable for this purpose. The basic substances are only required in catalytic quantities. Use of 1/20 of a mole of the base per mole of the pyridinium chloride is sufficient. The solvent should be employed in sufficient quantities to dissolve the reactants. Approximately, 100 to 200 ml. of solvent per mole of pyridinium chloride is generally adequate.

The above condensation reactions of the invention can generally be completed by heating the reaction mixtures at temperatures in the range of from about 90° C. to about 120° C. for a period of from about 2 to 5 hours. Where low boiling substances are employed, the reactions are preferably conducted under pressure. If water is removed during the reaction period, improved product yields may be obtained.

The desired styrylpyridinium chloride can generally be isolated by cooling the reaction mixture to effect precipitation of the product which is collected by filtration, washed with a small portion of cold solvent and dried under vacuum at elevated temperatures. If cooling does not effect precipitation, isolation is effected by reducing the quantity of solvent through evaporation under vacuum.

The high yield synthesis of 1-methyl-2-(p-chlorostyryl)pyridinium chloride is achieved by combining 1,2-dimethylpyridinium chloride with about 1 to about 1.2 moles of p-chlorobenzaldehyde per mole of the chloride. Piperidine catalyst is employed in the range of from about $7 \times 10^{-2}$ to about $21 \times 10^{-2}$ moles or more. The chloroform solvent is employed in a quantity sufficient to dissolve the reactants at the reaction temperature. Excess solvent is preferably avoided to facilitate isolation of the product. Chloroform ranging in quantities of from about 490 to 815 ml. per mole of the pyridinium chloride is generally preferred.

It is preferred to minimize the concentration of dimethylpyridinium chloride by slowly adding it to the heated reaction mixture. For ease in handling, it can be added in the form of a chloroform solution.

The reaction mixtures are refluxed at temperatures not exceeding 75° C. The aqueous fraction of the refluxing mixture is separated from the reaction mixture while the chloroform portion is preferably returned to the reaction mixture. This is conveniently achieved by means of conventional distillation traps, such as, the Hercules, modified Kingmen or crank case dilution test traps.

A reaction period of from about 2 to about 15 hours is generally suitable to effect complete reaction. The product is isolated by cooling the reaction mixture to effect its precipitation. It is collected by filtration, washed with a solvent, such as isopropanol, and dried under vacuum. By the above method, the desired product can be obtained in yields of up to 96% with a product purity of over 97%.

The present invention is further illustrated by the following examples. Unless otherwise indicated, all parts are by weight. The examples are presented to illustrate the invention and should not be taken as being limitative thereof.

EXAMPLE 1

A reaction mixture was prepared by combining 2-picoline (0.8 mole), p-chlorobenzaldehyde (0.8 mole), n-butanol (160 ml.), ammonium acetate ($3.5 \times 10^{-2}$ mole) and methyl chloride (.8 mole). The reactants were heated in a pressure vessel for a period of about 1 hour at 95–100° C. The reaction mixture was cooled, filtered and dried in vacuo to produce the desired product in a 40% real yield having 80% purity.

EXAMPLE 2

The general procedure of Example 1 was repeated substituting 67 ml. of dimethylformamide for the n-butanol used therein. A product of 66% purity with a real yield of 50% was produced after a period of heating at 100° C. for 2 hours.

EXAMPLE 3

The general procedure of Example 1 was repeated using 160 ml. of isopropanol in place of n-butanol used therein. The desired product was produced with a purity of 85% and a real yield of 47%.

EXAMPLE 4

The general procedure of Example 1 was repeated using 160 ml. of t-butanol in place of the n-butanol used therein. The desired product in 92.3% purity and 45.8% real yield was produced.

EXAMPLE 5

Preparation of 1,2-dimethylpyridinium chloride

Methyl chloride (49 grams, 0.97 mole) was introduced into a pressure vessel containing 2-picoline (0.80 mole) and 160 ml. of n-butanol at 78° C. Pressure in the vessel was maintained at 80 p.s.i. by the rate of methyl chloride addition. After the methyl chloride had been added, the stirred solution was maintained at from about 95–100° C. for 2 hours. The reaction mixture was cooled and solvent removal effected by evaporation in vacuo leaving the desired product in the form of a white crystalline solid in 92.4% yield.

2-(p-chlorostyryl)-1-methylpyridinium chloride

A mixture of 1,2-dimethylpyridinium chloride (16.28 grams, 0.10 mole), p-chlorobenzaldehyde (15.5 grams, 0.11 mole), ammonium acetate (0.34 gram) and 20 ml. of n-butanol was refluxed for a period of 4 hours during which the water produced by the condensation reaction was collected in an ice-cooled Dean-Stark trap. The reaction mixture was cooled to room temperature, diluted with 10 ml. of isopropanol and filtered. The desired product was washed with 10 ml. of isopropanol and dried under vacuum at 110° C. for 24 hours. It was produced in 98% purity and 59% real yield.

EXAMPLE 6 p-Chlorobenzaldehyde (46.4 grams, 0.33 mole), piperidine (3.0 ml.) and chloroform (50 ml.) were charged into a flask which was equipped with magnetic stirrer, reflux condenser and distillation receiver equipped to return the high density solvent while separating the aqueous constituent of the condensate. A 15.4% solution of 1,2-dimethylpyridinium chloride (0.3 mole) in chloroform was added to the heated solution over a period of about 5 hours. Reflux was continued for an additional 2 hour period at which time water representing 102% of theory had been collected. The reaction mixture was cooled and the desired product was removed by filtration, washed with 150 ml. of chloroform and dried at 130° C. for a period of 3 hours. The product having a purity of 97.4% and a real yield of 96.2% was produced.

EXAMPLES 7–13

Following the general procedure of Example 6, but substituting the appropriate aldehyde for p-chlorobenzaldehyde and the appropriate pyridinium chloride for 1,2-dimethylpyridinium chloride, produced the styrylpyridinium chlorides set forth in Table I below.

TABLE I

| Ex. No. | Pyridinium salt | Aldehyde | Product | Moles pyridinium salt | Moles aldehyde | H₂O, percent collected | Percent yield | M.P./°C and color | Elemental analysis (percent) |||||||
|---|---|---|---|---|---|---|---|---|---|---|---|---|---|---|
| | | | | | | | | | Calculated |||| Found |||
| | | | | | | | | | C | H | N | Cl | C | H | N | Cl |
| 7 | (CH₃)₂N-C₆H₄-N⁺(CH₃) Cl⁻ | 4-Cl-C₆H₄-CHO | (CH₃)₂N-C₆H₄-N⁺(CH₃)-CH=CH-C₆H₄-Cl  Cl⁻ | 0.2 | 0.22 | 100 | 68 | 256–258 yellow | 63.17 | 4.92 | 5.26 | 26.64 | 62.83 | 4.94 | 5.40 | 26.52 |
| 8 | N⁺(CH₃)(CH₃) Cl⁻ | 2-CH₃O-C₆H₄-CHO | pyridinium-CH=CH-C₆H₄-OCH₃  Cl⁻ | 0.3 | 0.33 | 100 | 62 | 215–216 yellow | 68.83 | 6.16 | 5.35 | 13.55 | 68.85 | 6.11 | 5.47 | 13.75 |
| 9 | N⁺(CH₃)(CH₃) Cl⁻ | (CH₃)₂N-C₆H₄-CHO | pyridinium-CH=CH-C₆H₄-N(CH₃)₂  Cl⁻ | 0.2 | 0.22 | 100 | 73 | 246–247 red | 69.93 | 6.93 | 10.20 | 12.90 | 69.93 | 7.00 | 10.03 | 13.02 |
| 10 | N⁺(CH₃)(CH₃) Cl⁻ | 4-CH(CH₃)₂-C₆H₄-CHO | pyridinium-CH=CH-C₆H₄-CH(CH₃)₂  Cl⁻ | 0.2 | 0.22 | 92 | 51 | 202–215 yellow | 74.57 | 7.36 | 5.12 | 12.95 | 73.57 | 7.28 | 4.90 | 12.52 |
| 11 | N⁺(CH₃)(C₂H₅) Cl⁻ | 3,4-Cl₂-C₆H₃-CHO | pyridinium-CH=CH-C₆H₃-Cl₂  Cl⁻ | 0.2 | 0.22 | | | | | | | | | | | |
| 12 | N⁺(CH₃)(C₂H₅) Cl⁻ | 4-NO₂-C₆H₄-CHO | pyridinium-CH=CH-C₆H₄-NO₂  Cl⁻ | 0.3 | 0.33 | | | | | | | | | | | |
| 13 | H₅C₂-N⁺(C₆H₄-CH₃) Cl⁻ | 3-OC₂H₅-C₆H₄-CHO | H₅C₂-N⁺-C₆H₄-CH=CH-C₆H₄-OC₂H₅ | 0.3 | 0.33 | | | | | | | | | | | |

We claim:
1. A process for the preparation of a styrylpyridinium chloride selected from the group consisting of:

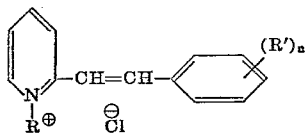

and

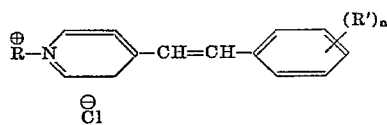

in which R is lower alkyl of from 1 to 6 carbon atoms, R' is selected from the group consisting of hydrogen, lower alkyl ($C_1$–$C_4$), alkoxy ($C_1$–$C_6$), nitro, lower alkylamino ($C_1$–$C_4$) and halogen, and $n$ is an integer selected from 1 and 2, comprising the steps of:
  (a) combining a pyridinium chloride selected from the group consisting of:

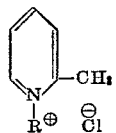

and

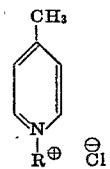

and an aldehyde of the formula:

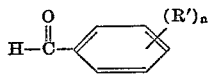

with a catalyst-solvent system selected from the group consisting of:
  (1) one or more polar solvents selected from the group consisting of: isopropanol and alkanols in the range of from 4 to 7 carbon atoms, and the weak base catalyst, ammonium acetate; and
  (2) the non-polar solvent, chloroform, and one or more strong bases selected from the group consisting of: piperidine, triethylamine, diethylamine and sodium acetate to form a reaction mixture; and
  (b) heating the reaction mixture to produce the desired styrylpyridinium chloride.

2. A process according to claim 1 further comprising the initial preparation of the pyridinium chloride, said process comprising the steps of:
  (a) combining 2-picoline, a lower alkyl chloride of the formula RCl and the aldehyde and catalyst-solvent system to form the reaction mixture; and
  (b) heating the reatcion mixture to produce the desired styrylpyridinium chloride.

3. A process according to claim 2 wherein the lower alkyl chloride is methyl chloride, the aldehyde is p-chlorobenzaldehyde, the catalyst is ammonium acetate and the solvent is isopropanol.

4. A process for the preparation of 1-methyl-2-(p-chlorostyryl)pyridinium chloride according to claim 1 comprising the steps of:
  (a) combining p-chlorobenzaldehyde, a catalyst selected from the group consisting of triethylamine, piperidine and mixtures thereof, and, the solvent chloroform to form a reaction mixture; and
  (b) heating the reaction mixture while adding 1-methyl-2-picolinium chloride thereto to produce 1-methyl-2-(p-chlorostyryl)pyridinium chloride.

5. A process according to claim 4 wherein the reaction mixture is heated to reflux and the aqueous constituent of the reflux is isolated.

6. A process according to claim 5 wherein the 1,2-dimethylpyridinium chloride, p-chlorobenzaldehyde, piperidine and chloroform are combined in the following relative amounts, respectively: 1 mole:1–1.2 moles:7 $\times 10^{-2}$ moles–21 moles:490 ml.– 815 ml. and the reaction mixture is refluxed at a temperature not exceeding 75° C.

References Cited
UNITED STATES PATENTS

| 2,255,077 | 9/1941 | Middleton | 260—240 D |
| 3,177,116 | 4/1965 | Wood et al. | 260—240 D X |

FOREIGN PATENTS

| 751,135 | 6/1956 | England | 260—240 D |

OTHER REFERENCES

Phillips, J. Org. Chem., vol. 12, pp. 333–341 (1947).

JOHN D. RANDOLPH, Primary Examiner

U.S. Cl. X.R.

260—240.9; 424—263